US009848691B1

(12) United States Patent
Pedersen

(10) Patent No.: US 9,848,691 B1

(45) Date of Patent: Dec. 26, 2017

(54) CONTAINER HOLDER

(71) Applicant: Calvin C. Pedersen, Wilmont, SD (US)

(72) Inventor: Calvin C. Pedersen, Wilmont, SD (US)

( * ) Notice: Subject to any disclaimer, the term of this patent is extended or adjusted under 35 U.S.C. 154(b) by 7 days.

(21) Appl. No.: 15/091,948

(22) Filed: Apr. 6, 2016

(51) Int. Cl.
*A47G 23/02* (2006.01)
*A45F 5/00* (2006.01)
*F16M 13/02* (2006.01)

(52) U.S. Cl.
CPC ............. *A45F 5/00* (2013.01); *F16M 13/022* (2013.01)

(58) Field of Classification Search
CPC . A47G 23/0225; A47G 23/0208; B60N 3/103
See application file for complete search history.

(56) References Cited

U.S. PATENT DOCUMENTS 2,879,023 A * 3/1959 Barrier ............... A47G 23/0225 248/231.41
2,880,953 A * 4/1959 Dicks ....................... B44D 3/14 248/210
3,182,943 A * 5/1965 Crossman ............. B44D 3/123 248/210
3,341,242 A 9/1967 Carson
3,939,986 A * 2/1976 Pierro ...................... A47C 7/62 108/44
3,987,993 A * 10/1976 Hopkins ................... E06C 7/14 248/110
4,013,251 A * 3/1977 Cleveland ................. E06C 7/14 248/210
4,036,463 A * 7/1977 Hopkins ................ B44D 3/123 248/110
4,560,127 A * 12/1985 Ippolito .................... E06C 7/14 182/106
4,606,523 A 8/1986 Statz
D287,789 S 1/1987 Johnson
4,776,550 A * 10/1988 Storey ....................... E06C 7/14 182/129
D303,057 S 8/1989 Smith
4,865,237 A * 9/1989 Allen ................. A47G 23/0225 224/278
4,984,722 A * 1/1991 Moore ................... B60N 3/102 224/549
5,007,612 A * 4/1991 Manfre .................. A01K 97/00 220/DIG. 9
D322,512 S 12/1991 Andrykovitz
5,106,045 A * 4/1992 Bezotte ..................... E06C 7/14 182/129

(Continued)

OTHER PUBLICATIONS

Cement Can Carrier, technical specifications, www.oatey.com, Jan. 2011.

*Primary Examiner* — Bradley Duckworth

(74) *Attorney, Agent, or Firm* — Jeffrey A. Proehl; Woods, Fuller, Shultz & Smith, P.C.

(57) ABSTRACT

A container holder may include a receptacle portion with at least one receptacle defining a space for receiving a lower portion of a container, and a mounting portion extending from the receptacle portion and configured to mount on a structural member positioned in at least two orientations. The at least two orientations may include a first orientation in which a relatively narrow edge of the board is oriented upwardly and a second orientation in which a relatively broad edge of the board is oriented upwardly.

13 Claims, 2 Drawing Sheets

(56) References Cited

U.S. PATENT DOCUMENTS

| | | | | | |
|---|---|---|---|---|---|
| 5,106,046 | A * | 4/1992 | Rowles | B60N 3/103 248/214 |
| D328,167 | S * | 7/1992 | Danitis | D25/68 |
| 5,148,755 | A * | 9/1992 | Morales | A47B 23/02 108/46 |
| 5,170,980 | A | 12/1992 | Burrows | |
| D353,082 | S | 12/1994 | Keven | |
| D358,303 | S | 5/1995 | Guarrera | |
| 5,605,312 | A * | 2/1997 | Elder | A47C 7/68 248/229.26 |
| D444,683 | S | 7/2001 | Corrion | |
| D594,164 | S * | 6/2009 | Lee | D32/54 |
| 7,959,121 | B1 * | 6/2011 | Barnes, Jr. | A47G 23/0225 224/148.4 |
| 8,333,300 | B2 * | 12/2012 | Diaz | B44D 3/14 211/65 |
| 9,004,433 | B2 | 4/2015 | Krieger | |
| D731,253 | S | 6/2015 | Conant | |
| 9,174,799 | B2 | 11/2015 | Virgen | |
| 9,353,571 | B2 * | 5/2016 | Coe | E06C 7/14 |
| 9,642,485 | B2 * | 5/2017 | Kuznicki, Jr. | A47G 23/0225 |
| 2016/0045048 | A1 * | 2/2016 | Katz | A47G 23/0225 220/737 |

* cited by examiner

CONTAINER HOLDER

BACKGROUND

Field

The present disclosure relates to holders and more particularly pertains to a new container holder for holding containers in a convenient manner in construction spaces.

SUMMARY

In one aspect, the present disclosure relates to a container holder which may include a receptacle portion with at least one receptacle defining a space for receiving a lower portion of a container, and a mounting portion extending from the receptacle portion and configured to mount on a structural member positioned in at least two orientations. The at least two orientations may include a first orientation in which a relatively narrow edge of the structural member is oriented upwardly and a second orientation in which a relatively broad edge of the structural member is oriented upwardly.

In another aspect, the disclosure relates to a container holder which may include a receptacle portion with at least two receptacles each defining a space for receiving a lower portion of a container, and a mounting portion extending from the receptacle portion and configured to mount on a structural member positioned in at least two orientations. The mounting portion may include a first saddle structure configured to mount on a structural member in a first orientation in which a relatively narrow edge of the member being oriented upwardly and a second saddle structure configured to mount on the structural member in a second orientation in which a relatively broad edge of the structural member being oriented upwardly. Each of the saddle structures may define a gap for receiving a portion of the structural member therein, with the gap of the first saddle structure being smaller than a gap of the second saddle structure.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
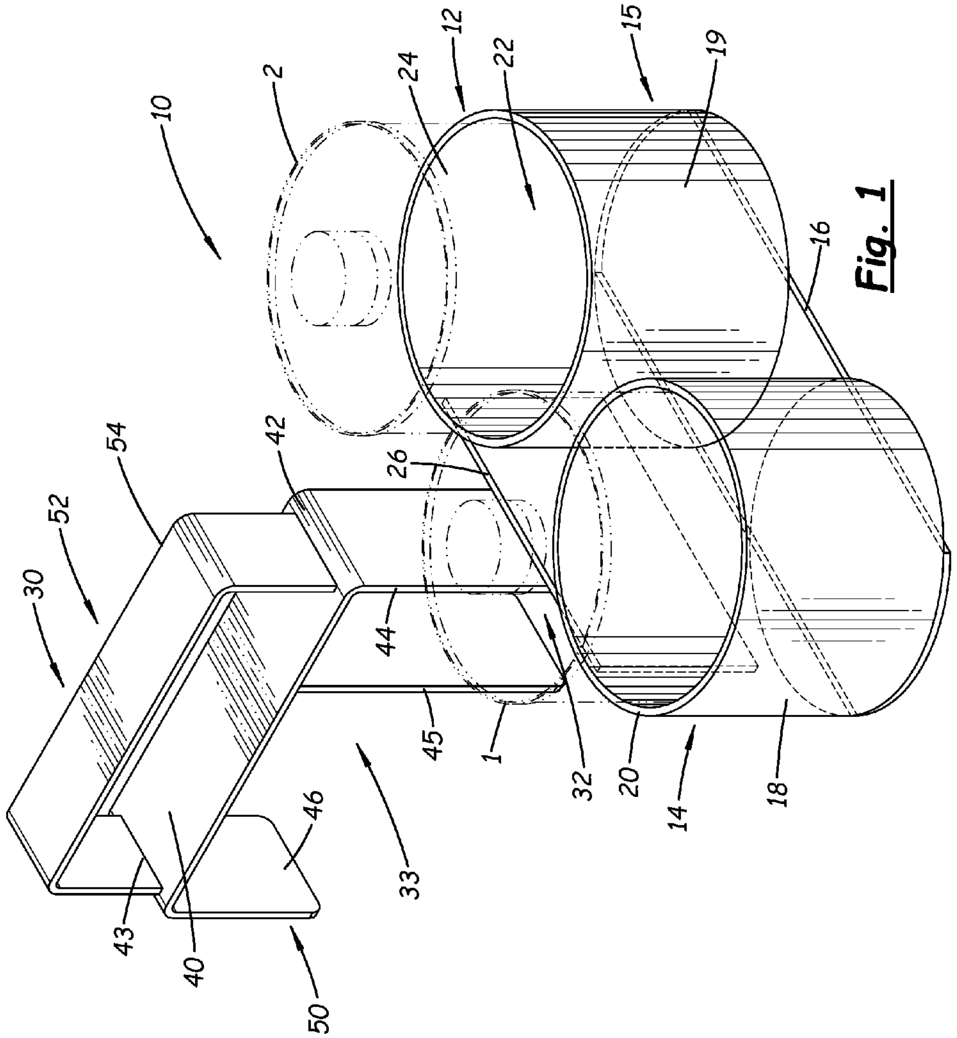
FIG. 1 is a schematic perspective view of a new container holder according to the present disclosure, with illustrative containers shown in broken lines.
Figure 2:
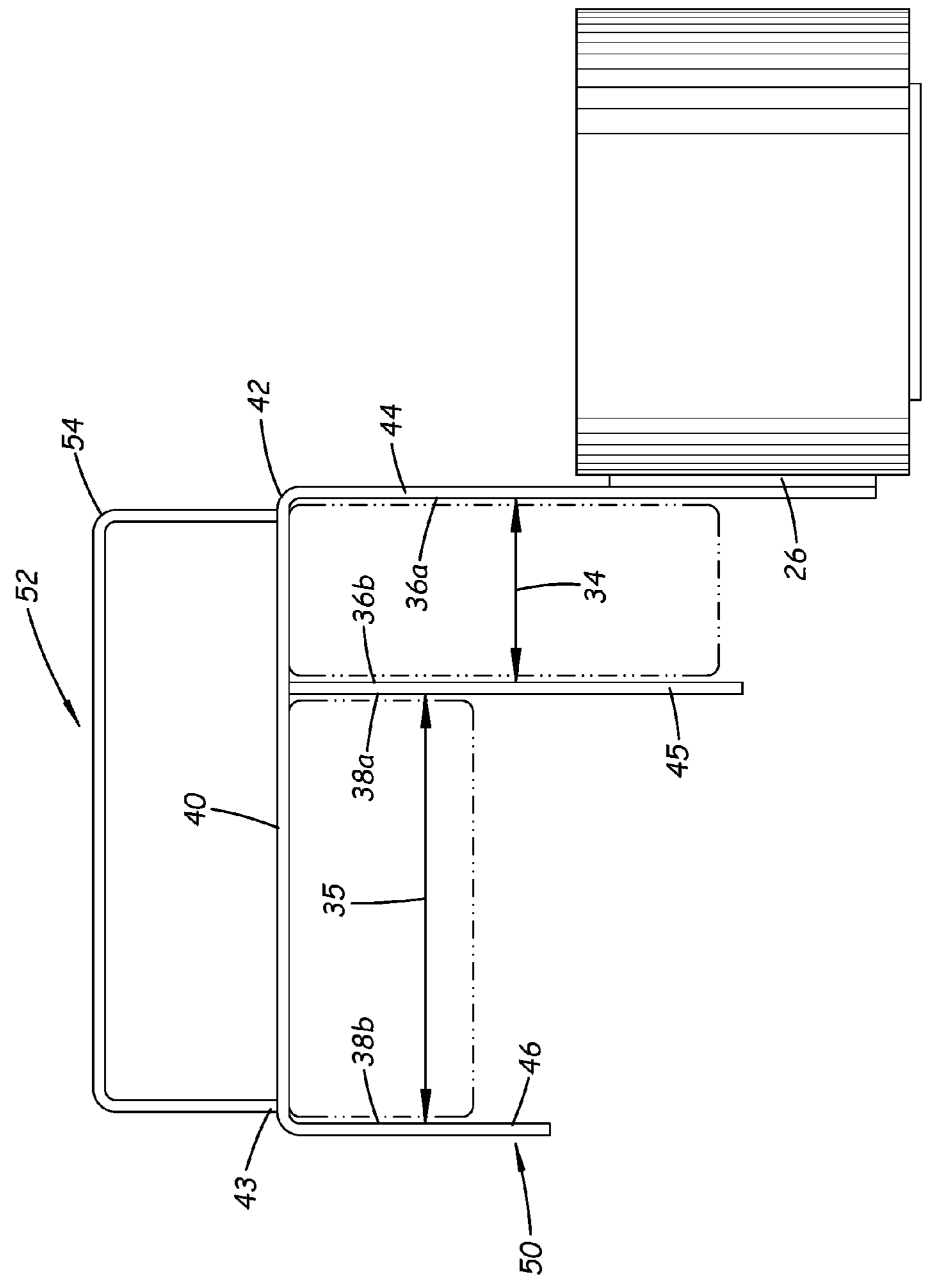
FIG. 2 is a schematic side view of the holder, according to an illustrative embodiment, with illustrative structural elements shown in broken lines.

With reference now to the drawings, and in particular to FIGS. 1 and 2 thereof, a new container holder embodying the principles and concepts of the disclosed subject matter will be described.

The applicant has recognized that in working in the building trades, there are often situations in which it is convenient to have containers supported or held closely proximate to the area where the work is being performed. A highly illustrative example is the container that is used to hold a liquid applied to polyvinyl chloride (PVC) pipe elements to bond the elements together, but other containers having a variety of different types of contents may also be suitable. Bonding of PVC pipe elements typically utilizes a two step process, in which a liquid primer is applied to the surfaces to be bonded and then the liquid glue is applied before the pipe elements are fitted together to bond. Containers designed to hold the primer and the glue for bonding PVC pipe elements together typically have a cap that incorporates a brush that extends into the interior of the container and into the contents held therein. Due to the liquid character of the primer and the glue, and the relatively short bonding time characteristic of the glue, it is advantageous to have the containers of primer and glue relatively close to the location on the building structure where the PVC pipe elements are being bonded.

However, often such PVC elements are located in confined spaces in the building structure only accessible during the construction of the structure, such as the spaces or bays between structural members, such as studs in a wall or between joists in a floor or ceiling. During construction, typically there are few surfaces on which to rest a container, much less a pair of containers, in a manner that is secure and does not produce a significant likelihood that the contents of the open container could be spilled. Moreover, quite often during the PVC bonding process, the container cap is only loosely rested on the container opening with the brush submerged in the glue or primer, but the cap is not threaded onto the container, so that the brush is quickly accessible for application of the contents to the PVC element. The container is thus often not capped in a manner that would prevent the escape of the contents if the container would fall and land on its side or even on its top. Also, the introduction of a length of PVC pipe into the confined bay between structural members only increases the likelihood that the PVC pipe elements being bonded may strike the partially opened containers and knock the containers over, resulting in spillage.

As a result, the ability to securely hold one or two of the containers in a secure manner utilizing the environment of the construction area can be very advantageous. Typically the structural elements or members, such as studs and joists, are formed of dimensional lumber, usually nominally two inches thick and ranging in width from four to twelve or more inches, and often these structural members are not all oriented in the same manner as each other. For example, floor and ceiling joists are often oriented with the edge or narrow face facing upward, while wall members such as headers or window framing often have the wider or broad face of the structural members facing upward. The structural members may comprise a wood or wood-containing board, and may comprise a board with a nominal 2 inch thickness and an actual thickness of approximately 1.5 inches. The board may have a nominal width of 4 inches, 6 inches 8 inches, etc. For the purposes of this description, the board would be considered to be a nominal 2 inch by 4 inch board, which dimensionally has an actual thickness of approximately 1.5 inches by approximately 3.5 inches.

The applicant has recognized that there is a need for a holder for one or more of these containers that is better adapted to mount in the environment in which PVC pipe elements are being bonded together, and utilize the structural members typically found in the environment. In some aspects, the disclosure relates to a container holder 10 which may be configured to support at least one, and in some embodiments two, containers 1, 2. An example of a highly suitable container for being supported by the container holder 10 may have a cylindrical outer surface and an upper opening which may be closed by a removable cap.

The container holder 10 may include a receptacle portion 12 with at least one receptacle 14. The receptacle 14 may include a base wall 16 and a perimeter wall 18 which extends upwardly from the base wall, and may collectively define a space for receiving at least a lower portion of a container 1. The perimeter wall 18 may have an upper edge 20 which defines an upper opening 22, and the perimeter wall may also have an inner surface 24 which may be substantially cylindrical in shape and may be dimensioned for a diameter that is slightly larger than the diameter of the cylindrical outer surface of the container.

In some of the most preferred embodiments, the receptacle portion 12 includes at least two receptacles 14, 15, and the perimeter walls 18, 19 of the two receptacles may be positioned adjacent to each other. The perimeter walls of the receptacles may be connected to each other, and in some embodiments the receptacles are connected together by the use of a single base wall 16. The two receptacles 14, 15 may be connected together by a connector member 26 which may be attached to each of the perimeter walls 18, 19 of the two receptacles.

The container holder 10 may also include a mounting portion 30 which may extend from the receptacle portion and may be configured to mount on a structural member positioned in at least two orientations. The orientations may include a first orientation in which a relatively narrow edge face of the structural member (e.g., the approximately 1.5 inch side) may be oriented upwardly, and a second orientation in which a relatively broad side face of the structural member (e.g., the approximately 3.5 inch side) may be oriented upwardly.

The mounting portion 30 may include a pair of saddle structures 32, 33, with each of the saddle structures defining a gap 34, 35 (respectively) for receiving a portion of a structural member therein. The gap 34 of a first one 32 of the saddle structures may be smaller than a gap 35 of a second one 33 of the pair of saddle structures. The gap 35 of the saddle structure may be approximately twice the size of the gap 34 of the first saddle structure 32. Each of the saddle structures 32, 33 may be substantially U-shaped, and the respective gaps of the saddle structures may be formed between opposed inner surfaces 36*a*, 36*b*, 38*a*, 38*b*.

In some embodiments, the saddle structures may include a spine 40 for resting upon the upwardly facing face of the structural member when the holder is mounted on the structural member. The spine 40 may have a proximal end 42 and a distal end 43, with the proximal end being located closer to the receptacle portion and the distal end being located further away from the receptacle portion. Each of the saddle structures may include a pair of fingers 44, 45, 46 and each of the fingers may have one of the inner surfaces 38. The fingers may extend from the spine, and may be oriented substantially perpendicular to the spine. The first saddle structure 32 may define a gap 34 defined between surfaces 36*a*, 36*b* with a width wide enough to receive a structural member having an edge face being oriented upwardly. A second saddle structure 33 may define a gap 35 between surfaces 38*a*, 38*b* with a width wide enough to receive a structural member having a broad face being oriented upwardly. Illustratively, the first gap 34 may have a width of approximately 1.5 inches, or slightly larger to receive an edge portion of the structural member, while the second gap may have a width of approximately 3.5 inches or slighter larger to receive the broad portion of a structural member. Preferably, the fingers each have a length that is sufficient to extend along at least three quarters of the width of the face that is oriented perpendicular to the upward facing face, and may be longer than the three quarters dimension such that the finger extends along the entire side of the member.

Illustratively, a first one 44 of the fingers may be mounted on the receptacle portion 12, and may be located toward the proximal end 42 of the spine. A second one 45 of the fingers may be shared by the first 32 and second 33 saddle structures, and the second finger 45 may be located between the proximal 42 and distal 43 ends of the spine. A third one 46 of the fingers may also function as a hook 50, and may be located toward the distal end 43 of the spine. The hook 50 may be used to hook on other structures that are not structural members, such as, for example, a hole or depression in the top platform of a step ladder.

The container holder 10 may also include a handle portion 52 for gripping by the hand of a user to carry the holder and any container received in the holder, as well as assisting in the positioning and placement of the holder on a structural member. The handle portion 52 may be mounted on the mounting portion 30. The handle portion 52 may form a loop 54, and the loop may be partially formed by the handle portion and the mounting portion.

In use, the user may select a structural member close to the work area where PVC pipe elements needs to be joined together. Depending upon the orientation of the member, the first or second saddle structure may be moved onto the member such that the member slides inside the respective gap and the sizing of the gap at a dimension close to the width of the upward face allows the holder to maintain the holder in an upright orientation even when one or two of the containers is inserted into the receptacle portion. When the location of the work area changes, the holder may be moved to another structural member convenient to the new work area, and in some cases the containers may not have to be removed from the holder before moving and may not even have to be recapped during the move.

It should be appreciated that in the foregoing description and appended claims, that the terms “substantially” and “approximately,” when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that the steps shown in the drawing figures may be altered in a variety of ways. For example, the order of the steps may be rearranged, substeps may be performed in parallel, shown steps may be omitted, or other steps may be included, etc.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A container holder for holding at least one container on a structural member having at least two orientations, the at least two orientations including a first orientation in which a relatively narrow edge of the structural member is oriented upwardly and a second orientation of the structural member in which a relatively broad edge of the structural member is oriented upwardly, the holder comprising:

a receptacle portion with at least one receptacle defining a space for receiving a lower portion of a container;

a mounting portion extending from the receptacle portion and being configured to mount on the structural member when the structural member is oriented in either of all of the two orientations;

wherein the mounting portion forms at least two saddle structures including a first saddle structure and a second saddle structure, each of the saddle structures having a substantially U-shape and defining a gap with a width between sides of the U-shape; and wherein the width of a second gap of the second saddle structure is approximately twice the first width of a first gap of the first saddle structure to accept the structural member in the first orientation using the first saddle structure and accept the structural member in the second orientation using the second saddle structure.

2. The holder of claim 1 wherein the pair of saddle structures are formed by a spine and a plurality of fingers extending from the spine in a substantially perpendicular orientation to the spine to form the gaps.

3. The holder of claim 2 wherein the fingers of the saddle structure are substantially straight and parallel to each other.

4. The holder of claim 2 wherein a separation distance between a second finger and a third finger is approximately twice a separation distance between a first finger and the second finger.

5. The holder of claim 1 wherein the mounting portion includes a spine for resting upon the structural member when the holder is mounted on the structural member, and three fingers extending from the spine, each pair of adjacent said fingers defining a respective one of said gaps.

6. The holder of claim 1 wherein the receptacle portion has at least two receptacles.

7. The holder of claim 1 further comprising a handle portion for gripping by the hand of a user.

8. The holder of claim 7 wherein the handle portion forms a loop.

9. The holder of claim 7 wherein the handle portion is mounted on the mounting portion.

10. The holder of claim 1 wherein the receptacle includes a base wall and a perimeter wall extending upwardly from the base wall, the perimeter wall having an inner surface.

11. A container holder for holding at least one container on a structural member having at least two orientations, the at least two orientations including a first orientation in which a relatively narrow edge of the structural member is oriented upwardly and a second orientation of the structural member in which a relatively broad edge of the structural member is oriented upwardly, the holder comprising:

a receptacle portion with at least two receptacles each defining a space for receiving a lower portion of a container;

a mounting portion extending from the receptacle portion and configured to mount on a structural member when the structural member is oriented in either of all of the two orientations, the mounting portion including a first saddle structure and a second saddle structure, each of the saddle structures defining a gap with a width between sides of the saddle structure for receiving a portion of a structural member therein;

wherein the width of a second gap of the second saddle structure is approximately twice the first width of a first gap of the first saddle structure to accept the structural member in the first orientation using the first saddle structure and accept the structural member in the second orientation using the second saddle structure wherein the pair of saddle structures are formed by a spine and a plurality of fingers extending from the spine in a substantially perpendicular orientation to the spine to form the gaps, the fingers being substantially straight and parallel to each other, a separation distance between a second finger and a third finger being approximately twice a separation distance between a first finger and the second finger.

12. The holder of claim 11 wherein each of the saddle structures is substantially U-shaped to form the corresponding gap.

13. The holder of claim 11 further comprising a handle portion for gripping by the hand of a user.

* * * * *